Figure 1:
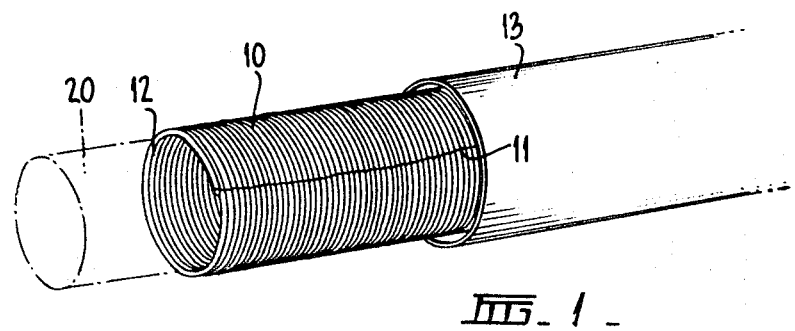

United States Patent

[11] 3,585,775

| [72] | Inventor | Benjamin Henry Stenniken<br>East Brighton, Victoria, Australia |
|---|---|---|
| [21] | Appl. No. | 867,709 |
| [22] | Filed | Oct. 20, 1969 |
| [45] | Patented | June 22, 1971 |
| [73] | Assignee | Engelhard Industries Pty. Ltd.<br>Thomastown, Victoria, Australia |
| [32] | Priority | Oct. 21, 1968 |
| [33] | | Australia |
| [31] | | 45107/68 |

[54] BULK PACKAGING OF ARTICLES
4 Claims, 5 Drawing Figs.

[52] U.S. Cl. ............................................... 53/23, 53/30
[51] Int. Cl. ............................................ B65b 63/04

[50] Field of Search .................................... 53/23, 30

[56] References Cited
UNITED STATES PATENTS

| 3,127,273 | 3/1964 | Monahan | 53/30 X |
| 3,491,507 | 1/1970 | Warfel | 53/30 |

Primary Examiner—Travis S. McGehee
Attorney—Pierce, Scheffler & Parker

ABSTRACT: A bulk package having a bundle of closely packed soldering and brazing split rings tightly sheathed in plastic material removable portionwise by hand enabling individual rings to be freed from the bundle for use. No adhesive of any kind is needed to keep the rings together or to hold the sheathing material to the bundle.

PATENTED JUN22 1971  3,585,775

BULK PACKAGING OF ARTICLES

This invention relates generally to an improved method of packaging bundles of separable articles in nonentangled relationship and which are stored and transported as a closely packed integral unit, each article being readily separable by hand from the closely packed unit during use.

More particularly and preferably, the invention concerns and is applicable to the packaging and sheathing of units of preformed or precut soldering or brazing split rings but is not necessarily limited thereto being applicable to a plurality of small articles of similar shape and nature which are capable of being closely packed and sheathed in a manually separable condition.

The object of this invention is therefore to provide a method of packaging as an integral unit metal pieces used for soldering or brazing so that each piece will be maintained in a closely packed substantially nonentangled but readily separable condition.

The invention according to one general form comprises a method of bulk packaging of metal pieces used for soldering or brazing which includes the steps of placing the pieces in closely packed or stacked relationship, placing around substantially the entire inner and/or outer exposed surfaces of the closely packed pieces a manually removable nonadhesive tubular covering or support of nonrigid material to maintain the pieces in closely packed and nonentangled condition as an integral unit when not in use but wherein the pieces are readily and manually separable from each other and from the covering or support during use.

More particularly the invention concerns a method of packaging annular shaped brazing or soldering split ring pieces which comprises placing such pieces in closely packed or stacked side-by-side relationship to form a tubular structure, applying to the inner and/or outer surface of this structure a continuous layer of nonhardening and preferably nonadhesive plastic material, thereby enveloping either or both of these surfaces with a firmly fitting but readily removable tubular sheath.

The sheathing or coating technique according to the invention is applicable to the closely and helically wound metal soldering brazing wire as it leaves a forming mandrel and which may be sheathed or coated either before or after cutting the wire into a plurality of identical split-ring shaped inserts.

The covering material as stated above is preferably nonhardening plastic material for example, polyvinyl chloride, which remains soft or pliable during storage, transit and use and which can be easily peeled by hand from packaged annular split-ring soldering pieces to enable separate ejection of the pieces from the covered package, when these are required to be separately ejected from the package during use. One of the plastic materials which is especially preferred is of the kind which can be thermally shrunk onto a tubular closely packed arrangement of annular soldering pieces. A suitable material of this type is commercially available as a plastic sleeving formed from polyvinyl chloride and sold under the trade mark THERMOTITE and which is enlarged during manufacture by a special process. The application of heat to this material at 285 F. for only 2 seconds results in a radial shrinkage of over 50 percent while the sheath or sleeve retains the shape of the object or objects being covered. An example of one suitable means for applying the heat is a heat gun which has blower and heating elements to deliver a hot blast of air. Alternatively, shrinkage can be obtained by immersion in a hot fluid, for example water.

In one example of the method of preparing and packaging annular metal soldering pieces, a closed up helical wire or, if desired, preformed and precut soldering split rings formed by longitudinally cutting through one side of a closely wound helical soldering wire, are placed so as to be in close contact with each other and are supported along a rod, for example an aluminum rod which is preferably placed inside the helix before making a longitudinal cut to obtain annular split ring pieces. A thin tubular sheath of heat shrinkable and nonadhesive plastic material is then placed longitudinally over the supported rings and the rod leaving a small overlap of material at each end of the sheathed structure to be inwardly crimped over the end or outermost ring and to enable a finger grip to be obtained on the tearable material during use. A hot-air blast is applied to the enclosing sheath and this blast then shrinks the sheath firmly over the packed rings holding them firmly and in closely packed condition. The supporting rod is retracted after sheathing of the split rings or uncut helical wire respectively. The plastic material is nonadhesive and can be easily peeled or stripped away as desired from either or both of the free ends of the packaged unit whenever it is desired to uncover and then manually eject single rings or pieces from the sheathed package during soldering.

According to another example of the method in accordance with this invention, a length of closely wound helical metal soldering wire is placed around or over a suitable rodlike carrying member for example an aluminum rod, and the supporting rod and wire is then immersed in a bath of molten thermoplastic and nonhardening material to coat the entire outer surface thereof to form after the nonhardening and peelable plastic material has set, a cylindrically shaped unit which may be converted into ready-to-use condition by making a longitudinal cut through the plastic and also through the helix to form separate but sheather "split-ring" soldering pieces, which are still, however, firmly yet separably retained within the sheath of plastic material as a packaged unit. The supporting rod is retracted after the plastic coating process.

Preferably, as in the previous example, using heat-shrinkable plastic sheath, a short overhang of the nonhardening peelable plastic material is left on either side of the sheathed metal "split-rings" or soldering inserts (at either or both ends of the package) both to firmly retain the end most rings of the cylindrical package when not in use, and also to provide a free edge or purchase to facilitate gripping and peeling away by the fingers of the user, of the plastic sheath material from the package when in use enabling separation and ejection of the split rings from the bulk of the rings which remain still firmly retained in the package.

In a further example the closed up helix of metal soldering wire is longitudinally cut before being sheathed with any pliable and manually removable plastic material.

In another example of the application of this invention either the closed up helix of metal wire, or a closely packed bundle of precut metal split rings, is coated by spraying nonhardening and peelable plastic material onto the external surface thereof to a suitable thickness to form a cylindrically shaped manually peelable sheath unit.

In still another example of an application of one form of the method according to this invention a closed helix of wire is dipped into molten plastic material to coat or sheath the helix throughout its length on both inner and outer surfaces. The molten plastic material is cooled and set to a relatively rigid but pliable state and a longitudinal cut is then made through the outer sheath and also through one side only of the metal helix to form the split-ring soldering pieces. The inner sheath is left intact during manufacture, storage and use and supports the rings. The outer sheath can be peeled off before transit or during use as desired. The sheathing material described above may be considered as disposable and the thickness of the material is kept to the minimum possible.

Figure 2:
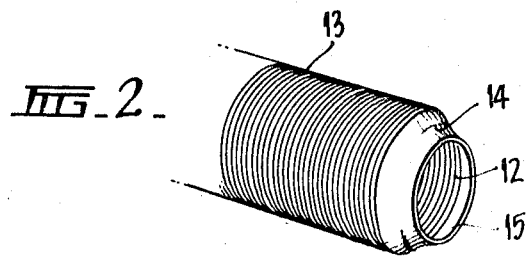
Figure 3:
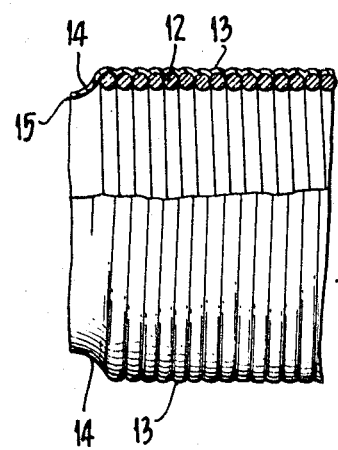
Figure 4:
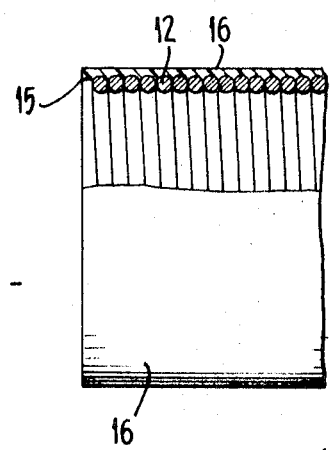
Figure 5:
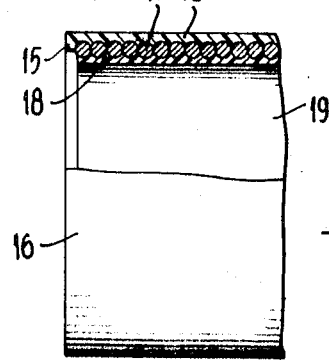

Preferred embodiments of the invention will be described in further detail and by way of illustration with reference to the accompanying drawings in which:

FIG. 1 is a perspective end view of a helical coil of soldering wire cut longitudinally into split rings over which a supporting sheath of heat-shrinkable plastic material is being placed. FIG. 2 is a similar view to FIG. 1 showing the sheathed package ready for use. FIG. 3 shows in partial section the end portion of a helix or bundle of split rings encased within the removable sheath of heat shrunk plastic material. FIG. 4 is a similar view to FIG. 3 of a package with split rings or helix encased within a tubular coating of plastic. FIG. 5 is a partial section of a modification with both sides of the helix or bundle of rings coated with plastic.

Referring to the drawings and in particular to FIG. 1, a length of closely wound helical brazing or soldering wire 10 which has been longitudinally cut on one side at 11 to form a plurality of separate but closely packed split rings 12 is shown being encased with a length of heat-shrinkable plastic tubing or sheathing 13 which for example is sold under the trade mark THERMOTITE and is of greater diameter than the helix (or closely packed split rings). In practice, the rings are supported on a cylindrical metal rod 20. The plastic sheathing is placed over the entire length of the tubular bundle of rings leaving a small overlap of plastic at each end (one-half inch would be sufficient). The heat-shrinkable plastic is then subjected to thermal treatment preferably by using a hot-air blast from a heat gun and the manner of encasement can be seen in the resultant sheathed package as shown in FIG. 2. The overlap 14 is crimped in over the end split rings by the heat shrinking process and the edge 15 of the sheath can be gripped and the material peeled or torn back to any extent desired to free individual rings 12 for use. The sheathing holds the split rings firmly in position during transit and storage and forms an integral tubular package with the rings.

In FIG. 3, the manner of envelopment of the individual rings 12 by the heat-shrunk sheath of plastic 13 is clearly shown where the rings are firmly held in close and nonentangling relationship but can be individually freed for use merely by peeling or tearing off the plastic sheath from the edge 15 at the overlap 14 at the crimped end of the sheath.

In the modification shown in FIG. 4, the split soldering rings 12 are shown encased not in heat-shrunk plastic but within a peelable coating of soft pliable thermoplastic material 16 which is left with a small overlap 15 to facilitate gripping and peeling away of the sheath from individual soldering rings. A suitable plastic material is a product sold under the trade name Bostik B19 by Bostik/Australia Pty. Limited.

In practice, the peeling away of the plastic sheath is facilitated by having one or more, preferably two rows of perforations extending longitudinally along the entire length of the sheath providing lines of weakness in the sheath.

In the further modification shown in FIG. 5 of the drawings, one end portion of a closely wound helix of soldering wire 17 has a coating of plastic both on its inner surface 18 and outer surface 16 leaving the usual overlap 15 of peelable plastic material. A longitudinal cut is made through one side of both the outer plastic coating and the helical wire producing annular shaped soldering or brazing split rings supported on the inner coating of plastic which is not cut through. The outer longitudinally cut sheath of plastic can be removed entirely leaving the rings detachably mounted on the inner cylinder or tube of plastic coating and from which individual split rings may be freed as required during use by pulling off the first ring or first few rings and peeling away the soft pliable plastic material.

It will be understood that neither the size, configuration or chemical composition of the metal substrate of this invention is critical and likewise the physical characteristics of the sheathing material are more important than the chemical composition insofar as the material should not stick to the separable articles and should remain soft and manually peelable during storage and use. It will be obvious to one skilled in the art that materials such as rubber and other materials may also be used although of course, rubber would tend to deteriorate during storage. The precise nature and thickness of the sheathing material is not critical but is governed by economical factors and also the amount used should only be sufficient to retain the sheathed article or articles in place during transit and storage and yet enable a subsequent user to readily peel the sheath away when the article or articles is or are needed.

I claim:

1. A method of bulk packaging a plurality of annular metal pieces used for soldering or brazing which includes the steps of forming a wire strip into a closely wound helix, supporting the helix on a cylindrical metal rod and longitudinally cutting through one side of the helix to form a bundle of closely packed split rings pieces stacked in side-by-side relationship, placing a length of tubular nonadhesive heat-shrinkable plastic sheathing, having internal diameter greater than the external diameter of the pieces, over the outside of and along the length of the bundle to envelop all of the pieces, heat shrinking the plastic sheathing onto the bundle and onto the entire surface of the rings by application of a hot air blast to form an integral, relatively rigid tubular package of closely packed and separable pieces within a manually removable sheath of said plastic material, and removing the supporting rod.

2. The method defined in claim 1 which includes the further steps of supporting annularly shaped split ring soldering rings, in closely packed relationship, and coating the pieces so supported with a sheathing of a nonadhesive and nonhardening plastic material which remains readily removable by hand during storage and transit.

3. The method defined in claim 1 which includes the further step of providing at one end of the package an overhang of covering or sheathing material to facilitate gripping and peeling away of the manually removable plastic sheathing from the pieces to free individual pieces from the package.

4. The method defined in claim 2 which includes the further step of providing the plastic sheath with at least one row of perforations extending longitudinally along the entire length of the sheath.